United States Patent [19]
Mayfield

[11] Patent Number: 5,138,920
[45] Date of Patent: Aug. 18, 1992

[54] PASSIVE DIFFERENTIAL POWER SHUNTED LOAD AND SPEED CONTROL APPARATUS

[75] Inventor: Alfred B. Mayfield, Halsted, Kans.

[73] Assignee: Ryobi America Corporation, Anderson, S.C.

[21] Appl. No.: 743,156

[22] Filed: Aug. 9, 1991

[51] Int. Cl.⁵ ............................................. B27B 5/18
[52] U.S. Cl. ................................. 83/471.2; 83/485; 83/DIG. 1; 188/82.84
[58] Field of Search .................... 83/471.2, 471.3, 483, 83/485, 486.1, DIG. 1, 484; 192/48.1, 48.3, 48.4, 44 R; 188/82.84, 82.8, 180

[56] References Cited

U.S. PATENT DOCUMENTS

| | | | |
|---|---|---|---|
| 4,590,831 | 5/1986 | Brodin | 83/56 |
| 4,620,352 | 11/1986 | Sulej | 29/251 |
| 4,856,623 | 8/1989 | Romig, Jr. | 188/180 |
| 4,870,882 | 10/1989 | Faxon, Sr. | 83/471.3 |
| 5,052,255 | 10/1991 | Gaines | 83/485 |

Primary Examiner—Douglas D. Watts
Assistant Examiner—Allan Schrock
Attorney, Agent, or Firm—Brooks & Kushman

[57] ABSTRACT

A radial arm saw includes a mounting arm having a carriage mounted thereon for linear movement. A handle is also mounted on the arm and carries out movement of the carriage. The handle is movable relative to the carriage through a limited range of movement when an operating force is exerted on the handle, but at least a portion of the operating force is transmitted to the carriage. A speed control assembly limits the maximum speed at which the carriage may be moved in the radially outward direction to the speed of the handle, the speed control assembly preventing movement of the carriage in the first direction at a speed greater than the speed of the handle. The speed control assembly is driven by a shunting assembly which also establishes the maximum speed at which the speed control assembly permits the carriage to be moved radially outward.

11 Claims, 6 Drawing Sheets fig-1 fig-15

PASSIVE DIFFERENTIAL POWER SHUNTED LOAD AND SPEED CONTROL APPARATUS

BACKGROUND OF THE INVENTION

1. Field of the Invention

The present invention relates generally to power driven saws and, more particularly, to a load and speed control apparatus for use on such saws in preventing a movable carriage provided on the saw from kicking radially outward toward an operator during a sawing operation.

2. Discussion of the Prior Art

Radial arm saws are commonly used by carpenters and craftsmen to perform a variety of wood working operations. An example of one such type of saw is the Sears/Craftsman 10" Radial Saw, which includes, among other features, a support frame for supporting the apparatus on the floor of a workshop or the like, and a mounting arm having a vertical pivot axis and means for mounting the arm on the frame for pivotal movement about the pivot axis. A carriage is mounted on the arm for radial movement along the arm relative to the pivot axis, and a saw blade is supported on the carriage for rotational movement relative to the carriage such that a power means may be actuated to rotate the saw to carry out a sawing operation. Of course, numerous companies market similar saws, and the problems discussed below are experienced in the use of these other available devices.

By providing a saw having a radial arm for use in supporting the saw blade and carriage, an apparatus results which is extremely versatile. For example, because the carriage is movable along the arm in the radial direction of the pivot axis, and due to the construction of the arm which permits the arm to be pivoted relative to the frame, it is possible to run the saw blade over a work table of the frame at any desired angle relative to the pivot axis. Thus, crosscuts at any desired angle may be made consistently by simply orienting the arm at the desired angle and moving the carriage in the radial direction of the arm.

Further, by providing for rotational movement of the carriage relative to the arm, the saw blade may be oriented for rotation about an axis extending in a direction parallel to the direction in which the arm extends such that rip sawing is possible. In such applications, wood is passed lengthwise beneath the carriage and saw blade while the blade is rotating such that a lengthwise cut is made without the carriage being moved.

A common problem experienced during the use of radial saws in making crosscuts includes the tendency of the carriage of such saws to kick away from the pivot axis of the arm toward an operator when the rotating blade encounters resistance in the material being cut. This kicking action of the carriage is a result of the moment force exerted on the carriage by the rolling action of the blade which occurs when the blade encounters such resistance, and can create serious safety risks to the operator. For example, when the carriage kicks toward the operator during a sawing operation, it is possible that the operator will be unprepared for such movement and may have their hand in the path of the blade such that injury would result from the unexpected carriage movement.

In an attempt to overcome this common problem, U.S. Pat. No. 4,590,831, to Brodin, illustrates the use of a radial arm saw having hydraulic stroke control means for controlling the speed of cut of the saw through work pieces positioned on a work table. The stroke control means includes a hydraulic cylinder having ports at either end thereof and a piston disposed between the ports and connected for movement with the carriage of the saw. The ports are connected to one another by a connection line that is provided with a valve for controlling the flow of fluid from one port to the other. The valve includes a pivotal lever for continuously adjusting the flow rate of fluid therethrough in order to set the control rate of the speed of the carriage.

Another patent illustrating the use of a device attempting to overcome the problem of kicking of the saw carriage away from the pivot axis of the arm during a sawing operation, is shown in U.S. Pat. No. 4,870,882, to Faxon Sr., wherein a radial arm saw control mechanism is provided with a piston and cylinder assembly having fluid flow means associated therewith for controlling movement of a radial arm saw toward and away from an operator.

Any control mechanism constructed in accordance with either of these two noted patents operates to restrain all movement of the saw by requiring the saw movement to be accompanied by the movement of a piston within the cylinder and of fluid which must pass through a by-pass conduit having an adjustable valve. Thus, the saw operator must always pull on the saw carriage against the full restraining force of the control mechanism in order to carry out a sawing operation.

OBJECTS AND SUMMARY OF THE INVENTION

It is an object of the present invention to provide a power driven saw having a passive differential power shunted load and speed control apparatus which will eliminate the above mentioned problems in existing radial saws and which will permit such saws to be used safely without the risk of unexpected, sudden movements of the saw blade that could, under normal circumstances, cause injury.

In accordance with these and other objects of the invention, a power drive saw constructed in accordance with the invention includes a mounting arm, a carriage mounted on the arm for linear movement in first and second linear directions along the arm, and a handle mounted on the arm for linear movement in the first and second linear directions at a desired speed in order to carry out movement of the carriage. The handle is movable relative to the carriage through a limited range of movement when an operating force is exerted on the handle, and force transmitting means are provided for transmitting to the carriage at least a portion of the operating force exerted on the handle in the first direction.

Speed control means limit the maximum speed at which the carriage may be moved in the first linear direction along the mounting arm to the speed of the handle. The speed control means permits movement of the carriage in the first linear direction at any speed equal to or less than the speed of the handle while preventing movement of the carriage in the first linear direction at a speed greater than the speed of the handle. The apparatus also includes shunting means for transmitting the movement of the handle to the speed control means for driving the speed control means and for establishing the maximum speed at which the speed control means permits the carriage to be moved in the first linear direction. The speed control means prevents the carriage from moving in the first linear direction until the movement of the handle has been transmitted to the speed control means by the shunting means.

Numerous advantages are realized by this construction. For example, by providing a speed control means and shunting means for transmitting the movement of the handle to the speed control means, it is possible to permit the carriage to be pulled toward the operator at any speed desired by the operator while preventing kicking of the carriage toward the operator at a speed greater than the speed at which the operator is pulling the handle. Thus, the operator may utilize the saw at any desired speed without being required to overcome the restraining force of the speed control means, and yet the carriage will be restrained when necessary to prevent kicking.

Another advantageous result of employing a power driven saw constructed in accordance with the present invention resides in the ability of the passive differential power shunted load and speed control apparatus to operate without the need for a separate motor or drive means by shunting a relatively small percentage of the manual force exerted on the handle of the saw for use by the load and speed control apparatus.

BRIEF DESCRIPTION OF THE DRAWING FIGURES

A preferred embodiment of the invention is described in detail below with reference to the attached drawing figures, wherein.

DETAILED DESCRIPTION OF THE PREFERRED EMBODIMENT

Figure 1:
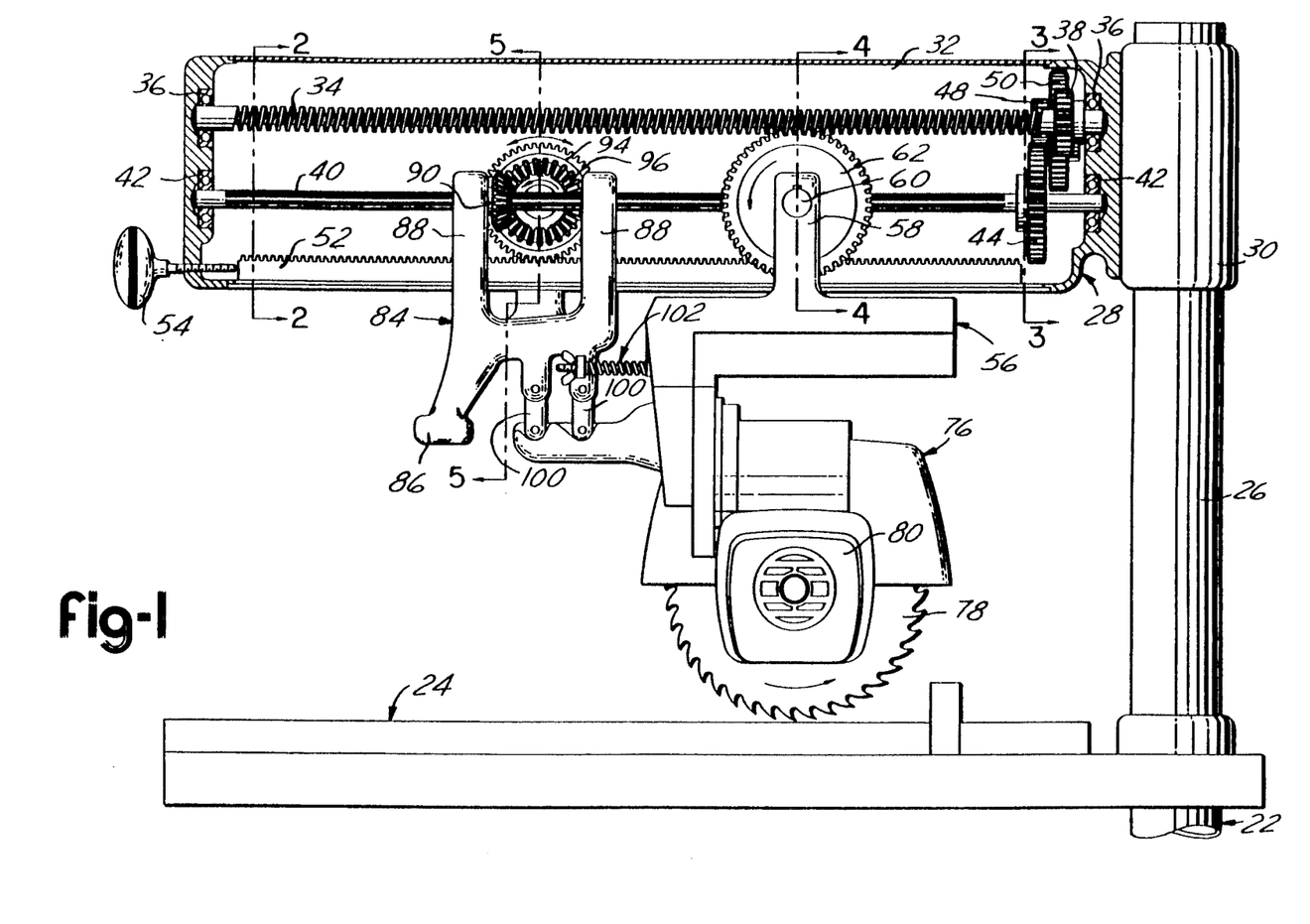
FIG. 1 is a side elevational view, partially in section, of a radial arm saw constructed in accordance with a first preferred construction of the present invention.

A radial arm saw constructed in accordance with the a first embodiment of the present invention is illustrated in FIGS. 1-7. Turning first to FIG. 1, the saw includes a support frame 22 having a work table 24. The frame 22 includes an upstanding portion 26 adjacent the work table 24 adapted to receive a mounting arm assembly 28 in such a manner as to permit pivotal movement of the arm assembly relative to the frame.

The arm assembly 28 includes a vertical cylindrical portion 30 received on the upstanding portion 26 of the frame 22 such that relative rotational movement therebetween is prevented and vertical movement of the cylindrical portion 30 is only permitted during intentional adjustment thereof as may be carried out in a conventional manner, such as by a rack and pinion arrangement.

A mounting arm 32 of the arm assembly 28 extends radially outward from the cylindrical portion 30 and is fixed to the cylindrical portion against vertical movement thereon. However, the arm 32 is rotatable relative to the cylindrical portion 30 between any of a plurality of angular positions in order to permit the arm to be disposed above the work table 24 at any desired angle.

A worm gear 34 is provided within the mounting arm and extends substantially the entire length of the arm. The worm gear is supported for rotational movement relative to the mounting arm 32 by a bearing assembly 36 provided at each axial end of the worm gear. An upper pinion gear 38 is connected to the worm gear at one axial end of the worm gear and is rotatable therewith.

A drive shaft 40 is also disposed within the mounting arm 32 and extends in a direction parallel to the direction of the worm gear 34 along substantially the entire length of the mounting arm 32. The drive shaft 40 is supported in bearing assemblies 42 provided at the axial ends of the drive shaft so that the drive shaft is rotatable relative to the mounting arm. A lower pinion gear 44 is mounted on the drive shaft at an axial end thereof adjacent the upper pinion gear 38 and rotates with the drive shaft.

Figures 2, 3:
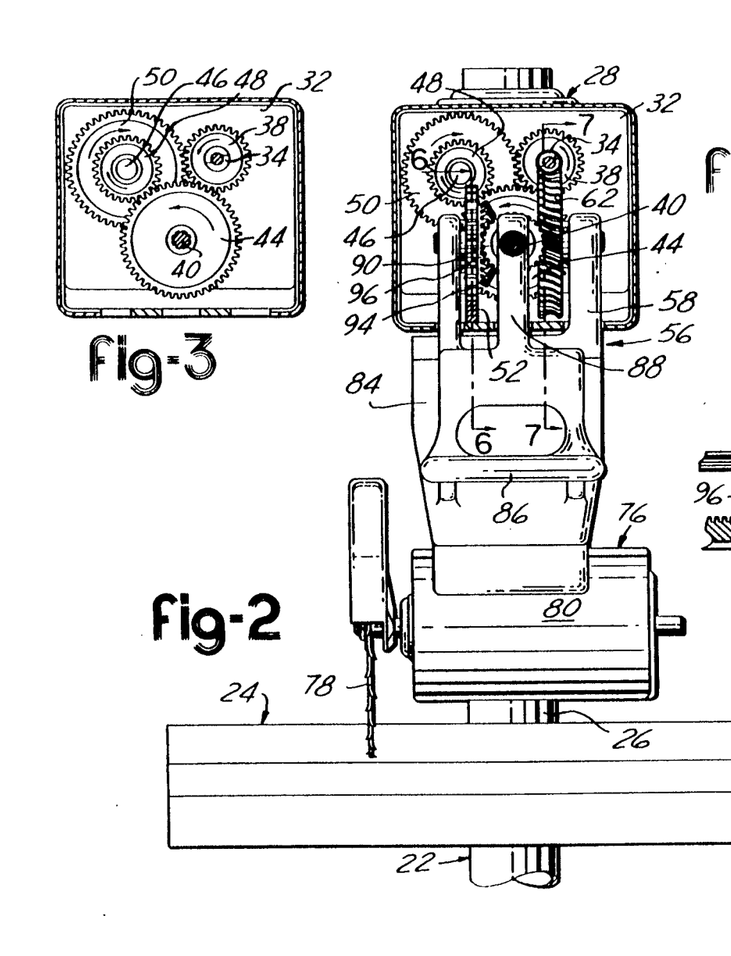
FIG. 2 is a front elevational view, partially in section, of the radial arm saw shown in FIG. 1.
FIG. 3 is a sectional view of the radial arm saw taken along line 3—3 in FIG. 1.

A jackshaft 46, shown in FIG. 3, may be provided between the upper and lower pinion gears and includes a pair of transmission gears 48, 50, one of which engages the lower pinion gear 44 and the other of which engages the upper pinion gear 38. The two transmission gears 48, 50 are secured to the jackshaft 46 for rotation together. Rotation of the drive shaft 40 is transmitted from the lower pinion gear 44 through the two transmission gears 48, 50 to the upper pinion gear 38 in order to transmit rotatable movement of the drive shaft to the worm gear 34.

The mounting arm 32 is provided with a toothed rack 52 which extends in a direction parallel to the drive shaft 40. The position of the rack within the mounting arm may be adjusted in the lengthwise direction of the rack by an adjustment means including a thumb screw 54 extending through a threaded opening in the mounting arm and attached to the rack 52 for rotatable movement relative thereto.

A carriage 56 is mounted on the arm 32 and is movable along the arm in a radial direction relative to the cylindrical portion 30. The carriage 56 is supported on the arm 32 in a conventional manner by a set of rollers or the like which permit linear movement of the carriage while preventing any significant amount of travel in any direction other than along the arm.

Figures 4, 5, 6, 7:
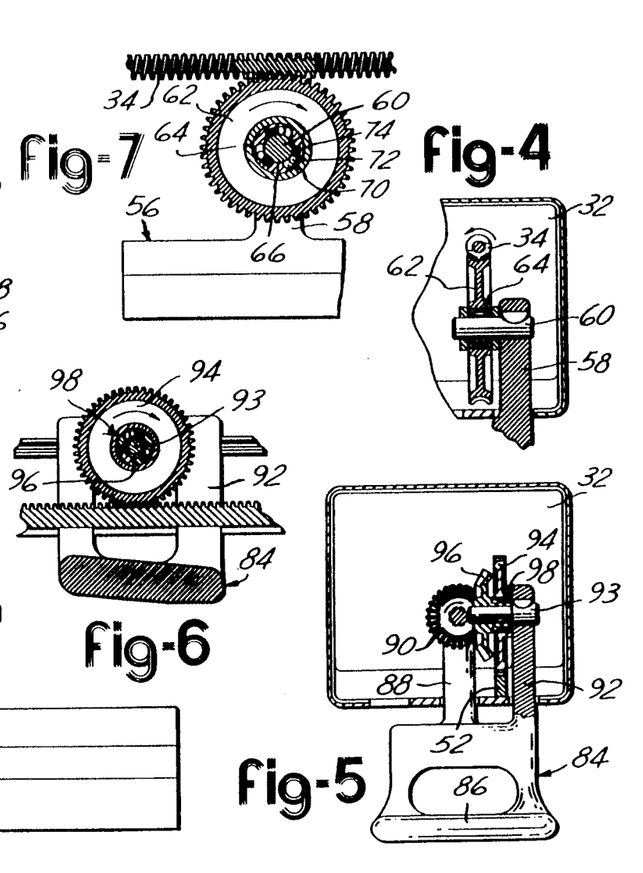
FIG. 4 is a sectional view of the radial arm saw taken along line 4—4 in FIG. 1.
FIG. 5 is a sectional view of the radial arm saw taken along line 5—5 in FIG. 1.
FIG. 6 is a sectional view of the radial arm saw taken along line 6—6 in FIG. 2.
FIG. 7 is a sectional view of the radial arm saw taken along line 7—7 in FIG. 2.

As shown in FIG. 4, the carriage 56 includes an upstanding arm 58 having a transverse opening through which a nonrotatable shaft 60 extends. A bull gear 62 is supported on the nonrotatable shaft 60 by an over-running clutch 64 which permits rotation of the bull gear on the shaft in only one direction, as indicated by the arrow in FIG. 1, while preventing rotation of the bull gear in the opposite direction. The bull gear 62 mates with the worm gear 34 so that rotation of the worm gear is transmitted to the bull gear.

The over-running clutch 64, as illustrated in FIG. 7, is of conventional construction and preferably includes an outer cylindrical member 66 fixed to the bull gear and an inner shaft defined by the nonrotatable shaft 60. The outer member 66 includes a plurality of inner circumferential slots 70 each including a shallow end and a deep end, and being adapted to receive a ball 72 and a compression spring 74 therein. The springs 74 are located in the deep ends of the slots and normally bias the balls in the clockwise direction toward the shallow ends such that the balls move toward the shallow ends of the slots 70 forcing the balls against the shaft 60.

In this manner, the outer member 66 is prevented from rotating counterclockwise relative to the shaft 60. However, the outer member 66 is not prevented from rotating in the clockwise direction relative to the shaft 60 since this movement of the outer member 66 moves the balls 72 toward the deep ends of the slots 70 against the bias of the springs 74 such that the balls are removed from holding contact with the shaft 60.

A saw blade assembly 76 is mounted on the carriage 56, and is fitted with a saw blade 78 and a saw motor 80 for driving the blade. The blade 78 is rotatable in the direction indicated by the arrow in FIG. 1 relative to the saw blade assembly in order to permit a sawing operation to be carried out. Typically, the blade 78 and motor 80 are movable together about a horizontal axis relative to the carriage 56 between a plurality of positions such that the angle of the blade may be adjusted to carry out various beveled crosscuts and rip cuts. In addition, the saw blade assembly 76 is rotatable relative to the remainder of the carriage 56 about a vertical axis between a crosscutting position in which the axis of rotation of the blade 78 extends transverse to the length of the arm, and a rip cutting position in which the axis of rotation of the blade extends in a direction parallel to the length of the arm.

A handle assembly 84 is supported by the mounting arm 32 for linear movement along the arm at a desired speed in order to carry out movement of the carriage 56. The handle assembly 84 includes a gripping portion 86 by which the assembly may be grasped by an operator when the carriage is to be moved relative to the arm.

A first pair of upstanding arms 88 protrude from the gripping portion 86 into the mounting arm 32, and are provided with transverse holes in which the drive shaft 40 is received. Suitable clearance is provided by the holes in the arms 88 to permit rotation of the drive shaft relative to the arms. A first bevel gear 90 is rotatably supported on one of the upstanding arms 88 and is splined to the drive shaft 40 so as to rotate with the drive shaft relative to the handle assembly 84 and to slide axially along the shaft.

Additional upstanding arms 92 protrude from the gripping portion 86 into the mounting arm 32 and are provided with a transverse hole which is perpendicular to the holes in the first pair of upstanding arms 88. As shown in FIG. 6, a shaft extends through the transverse hole in the arms 92 and supports a pinion gear 94 mounted on the shaft 93 for rotatable movement relative to the upstanding arms. The pinion gear 94 mates with the rack 52 provided on the mounting arm 32.

A second bevel gear 96 is also supported on the shaft 93 for rotational movement relative to the upstanding arm 92 and the pinion gear 94 is connected to the second bevel gear 96 by an over-running clutch 98, as shown in FIG. 5, which transmits the rotational movement of the pinion gear 94 to the second bevel gear 96 when the pinion gear 94 rotates in the direction indicated by the arrow in FIG. 6. When the pinion gear 94 rotates in a direction opposite to the direction shown by the arrow the rotational movement of the pinion is not transmitted to the second bevel gear due to the construction of the over-running clutch 98, which is similar to the over-running clutch discussed above.

Figures 9, 10, 11, 12, 13, 14:
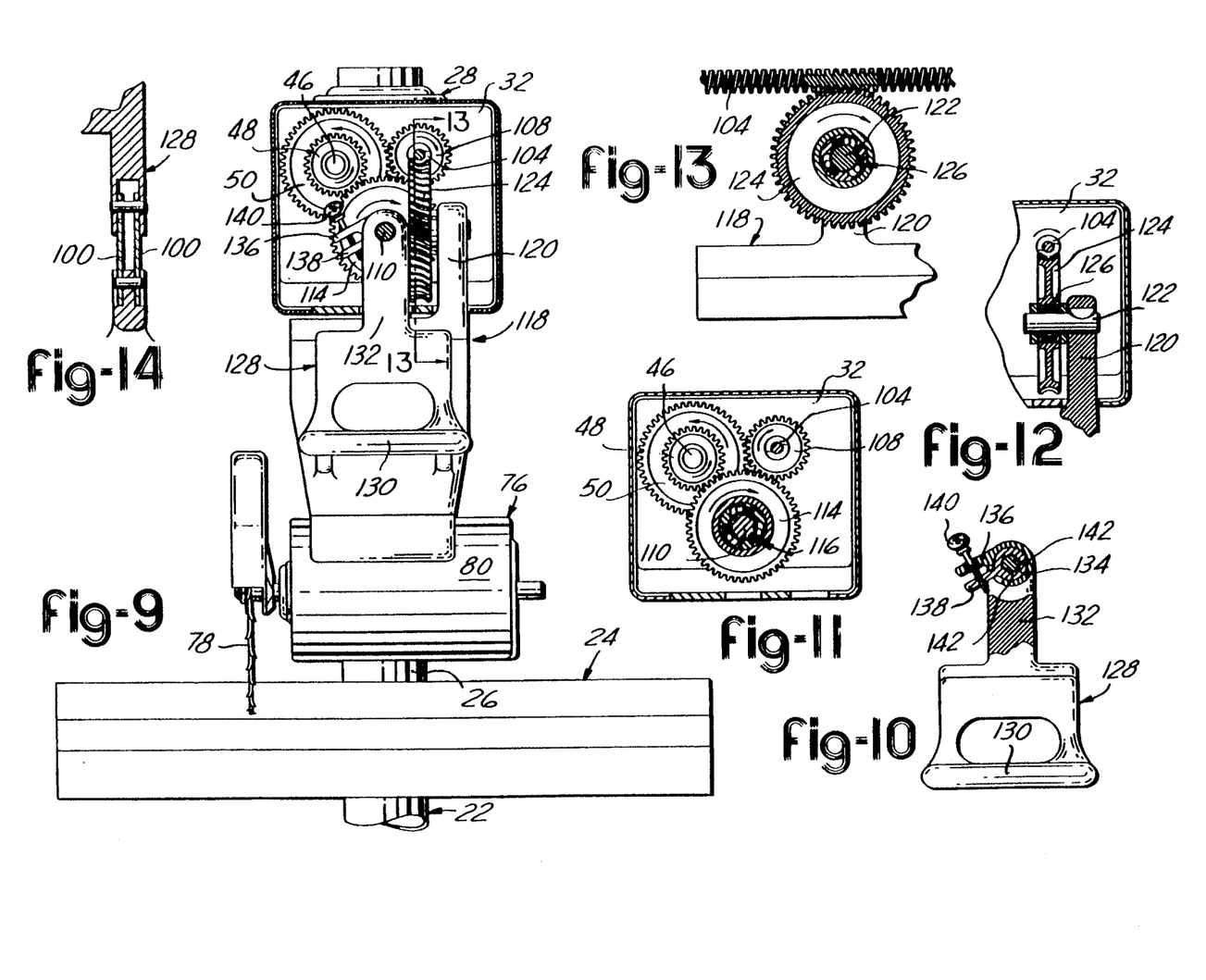
FIG. 9 is a front elevational view, partially in section, of the radial arm saw shown in FIG. 8.
FIG. 10 is a sectional view of the radial arm saw taken along line 10—10 in FIG. 8.
FIG. 11 is a sectional view of the radial arm saw taken along line 11—11 in FIG. 8.
FIG. 12 is a sectional view of the radial arm saw taken along line 12—12 in FIG. 8.
FIG. 13 is a sectional view of the radial arm saw taken along line 13—13 in FIG. 9.
FIG. 14 is a sectional view of the radial arm saw taken along line 14—14 in FIG. 8.

The handle assembly 84, in addition to being supported by the mounting arm 32, is also connected to the carriage 56 by a lost motion connection including two pair of links 100 extending between the handle assembly 84 and the carriage 56 and being pivotable relative to both such that the handle assembly may be moved slightly relative to the carriage, but remains connected to the carriage in order to permit the handle assembly to be used in moving the carriage back and forth along the mounting arm. The links of the lost motion connection are illustrated in FIG. 14. Returning to FIG. a biasing mechanism 102 is provided between the handle assembly 84 and the carriage 56 and biases the handle assembly toward the carriage.

The amount of lost motion which must be present between the handle assembly 84 and the carriage 56 may be varied by repositioning the rack 52 within the mounting arm 32 such that the handle assembly is moved relative to the carriage. The amount of lost motion should be as small as possible while still providing sufficient movement to initiate rotation of the bull gear 62 before a substantial pulling force is applied by the handle assembly to the carriage.

In order to operate the saw in carrying out a crosscutting operation, the saw motor is turned on, and the operator grabs hold of the gripping portion 86 of the handle assembly 84 and pulls the assembly in a direction away from the cylindrical portion 30 of the mounting arm assembly 28. This movement of the handle assembly causes the pinion gear 94 to rotate in a counterclockwise direction, as shown in FIG. 1, because of the engagement of the pinion gear with the rack 52. This rotation of the pinion gear 94 is transmitted to the second bevel gear 96 via the overrunning clutch 98, as shown in FIG. 6, which is engaged during such rotation of the pinion gear 94. The first bevel gear 90 is driven by the second bevel gear 98, and the rotation of the first bevel gear carries out rotation of the drive shaft 40 via the splined connection between the first bevel gear and the drive shaft.

The rotational movement of the drive shaft 40 is transmitted by the lower pinion gear 44 through the transmission gears 48, 50 and upper pinion gear 38 to the worm gear 34 which is rotated in the counterclockwise direction as shown in FIG. 2. This counterclockwise rotation of the worm gear causes the bull gear 62 on the carriage to rotate in the counterclockwise direction, as illustrated in FIG. 1. However, the over-running clutch 64 permits the bull gear to rotate without transmitting this movement to the nonrotatable shaft 60 of the carriage 56. Thus, the bull gear rotates freely and the carriage remains motionless during the initial movement of the handle assembly 84.

Once the handle assembly 84 has been moved through the distance of lost motion provided by the links 100 within the lost motion connection, the assembly exerts a pulling force on the carriage 56 tending to pull the carriage along with the handle assembly in a direction radially outward from the pivot axis of the mounting arm. Because the bull gear 62 is rotating in the counterclockwise direction, movement of the carriage 56 from right to left, as shown in FIG. 1, causes the speed of rotation of the bull gear to slow. However, so long as the carriage moves at a speed equal to or less than the speed of the handle assembly, the rotational force acting to rotate the bull gear in the clockwise direction will not overcome the rotational force exerted by the worm gear 34 acting to rotate the bull gear in the counterclockwise direction. Thus, the carriage 56 is free to follow the handle assembly 84 at whatever speed the handle assembly is pulled, so long as the carriage does not attempt to exceed the speed of the handle assembly.

If the saw blade 78 encounters resistance in the material being cut, and experiences a moment force tending to cause the blade to run or roll across the material away from the pivot axis toward the operator, this moment force is exerted on the carriage 56 and tends to move it toward the operator at a speed greater than the speed of the handle assembly 84. When this accelerated movement occurs, movement of the carriage 56 causes the clockwise rotational force acting on the bull gear 62 to overcome the counterclockwise rotation supplied by the worm gear 34. Thus, the bull gear 62 begins to rotate in the clockwise direction. However, any actual clockwise rotation of the bull gear relative to the nonrotatable shaft 60 causes engagement of the over-running clutch 64 between the bull gear and the shaft such that the bull gear is locked against such rotational movement thus preventing the carriage 56 from kicking toward the operator at a speed greater than that permitted by the worm gear 34.

During return movement of the carriage 56, the handle assembly 84 is pushed inward toward the pivot axis by the biasing mechanism 102. The handle assembly moves through the distance of lost motion in the connection back toward the carriage. During this movement of the handle assembly 84, as well as during subsequent movement thereof, the first bevel gear 90 slides along the drive shaft 40 without rotating the shaft. Although the pinion gear 94 rotates in a clockwise direction along the rack, as shown in FIG. 1, this rotation is not transmitted to the second bevel gear 96 since the over-running clutch 98 is disengaged when running in this direction. Thus, the drive shaft 40 remains motionless during return movement of the carriage 56, as do the gears 38, 44, 48, 50, and the worm gear 34.

During return movement, the bull gear rotates in the counterclockwise direction along the worm gear, and this movement is permitted by the over-running clutch 64 which is disengaged during such counterclockwise rotation of the bull gear.

Figure 8:
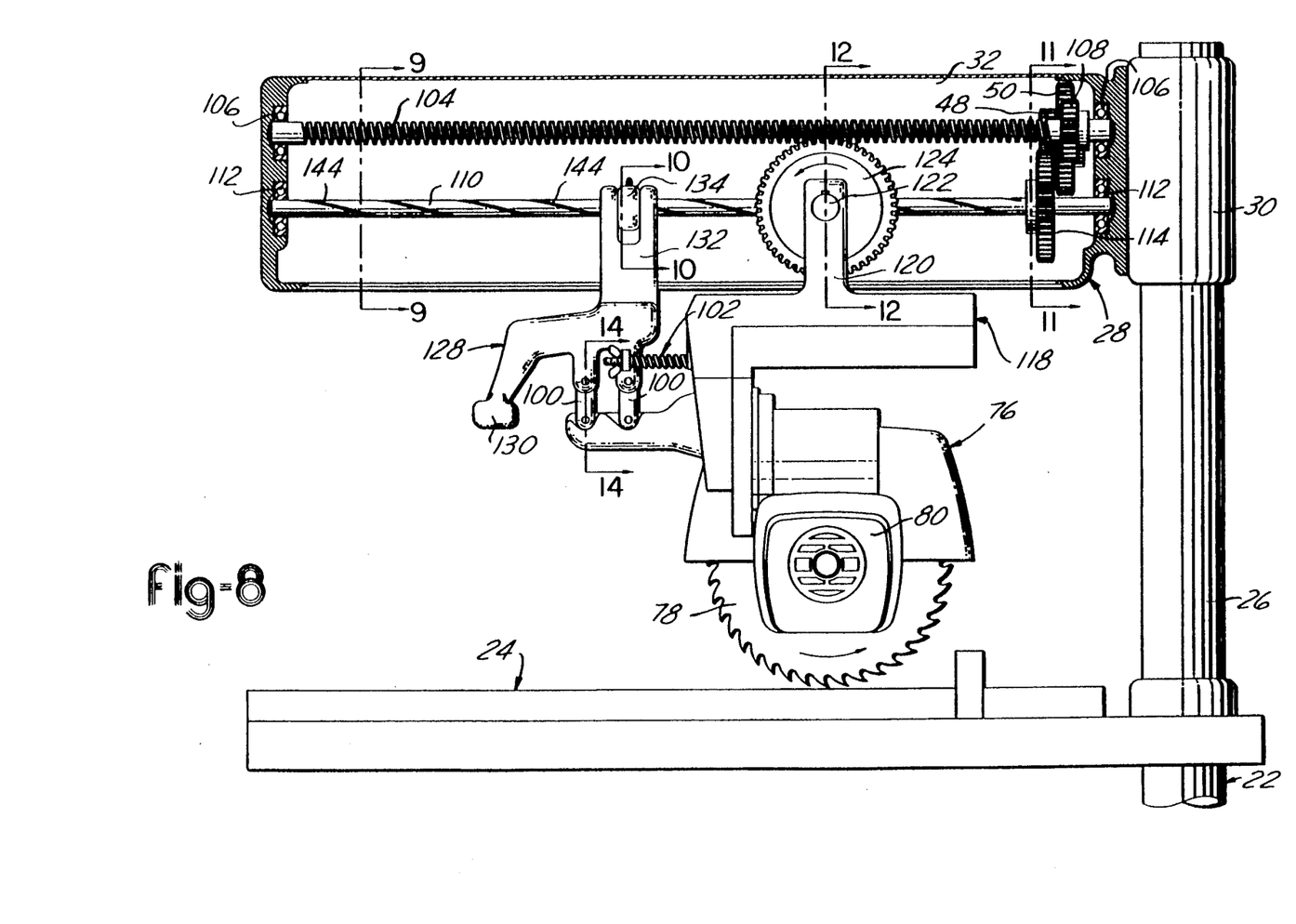
FIG. 8 is a side elevational view, partially in section, of a radial arm saw constructed in accordance with a second preferred construction of the present invention.

A radial arm saw constructed in accordance with a second embodiment of the present invention is illustrated in FIGS. 8-14. Turning first to FIG. 8, the saw includes a support frame 22 and work table 24 of the type described above with reference to the embodiment of FIG. 1.

A worm gear 104 is provided within a mounting arm 32 provided on the frame, and extends substantially the entire length of the arm. The worm gear is supported for rotational movement relative to the mounting arm by a bearing assembly 106 provided at each axial end of the worm gear. An upper pinion gear 108 is connected to the worm gear at one axial end thereof and is rotatable with the worm gear.

A drive shaft 110 is also disposed within the mounting arm and extends in a direction parallel to the direction of the worm gear 104 along substantially the entire length of the mounting arm. The drive shaft 110 is supported in bearing assemblies 112 provided at the axial ends thereof so that the drive shaft is rotatable relative to the mounting arm. A lower pinion gear 114 is connected via an over-running clutch 116 to the drive shaft 110 at an axial end thereof adjacent the upper pinion gear and transmits rotational movement of the drive shaft to the worm gear when the shaft rotates in the clockwise direction, as viewed in FIG. 11. A jackshaft 46, shown in FIG. 11, may be provided between the upper and lower pinion gears and includes a pair of transmission gears 48, 50, one of which engages the lower pinion gear 114 and the other of which engages the upper pinion gear 108. The two transmission gears 48, 50 are secured to the jackshaft 46 for rotation together. Rotation of the drive shaft 110 is transmitted from the lower pinion gear 114 through the two transmission gears 48, 50 to the upper pinion gear 108 in order to transmit rotatable movement of the drive shaft to the worm gear 104.

A carriage 118 is mounted on the arm and is movable along the arm in a radial direction relative to the cylindrical portion 30. The carriage 118 is supported on the arm in a conventional manner by a set of rollers or the like which permit linear movement of the carriage while preventing any significant amount of travel in any direction other than along the arm.

Turning to FIG. 12, the carriage 118 includes an upstanding arm 120 including a transverse opening through which a nonrotatable shaft 122 extends. A bull gear 124 is supported on the nonrotatable shaft by an over-running clutch 126 which permits rotation of the bull gear on the shaft in only one direction, as indicated by the arrow in FIG. 13, while preventing rotation of the bull gear in the opposite direction. The bull gear 124 mates with the worm gear 104 so that rotation of the worm gear is transmitted to the bull gear.

The over-running clutch 126, as illustrated in FIG. 13 is of conventional construction as described above with reference to the over-running clutch 64 shown in FIG. 7.

A saw blade assembly 76 is mounted on the carriage 118, and is fitted with a saw blade 78 and a saw motor 80 for driving the blade. The blade 78 is rotatable in the direction indicated by the arrow in FIG. 8 relative to the saw blade assembly in order to permit a sawing operation to be carried out. The blade 78 and motor 80 are movable together about a horizontal axis relative to the carriage 118 to carry out various beveled crosscuts and rip cuts. In addition, the saw blade assembly 76 is rotatable relative to the carriage 56 about a vertical axis between a crosscutting position.

A handle assembly 128 is supported by the mounting arm 32 for linear movement along the arm at a desired speed in order to carry out movement of the carriage 118. The handle assembly 128 includes a gripping portion 130 by which the assembly may be grasped by an operator when the carriage is to be moved relative to the arm.

As shown in FIG. 9, an upstanding arm 132 protrudes from the gripping portion into the mounting arm, and is provided with a hole in which the drive shaft is received. Suitable clearance is provided by the hole to permit rotation of the drive shaft relative to the upstanding arm 132. Turning to FIG. 10, an adjustable collar 134 is secured to the upstanding arm 132 by an adjustable connection including a first tongue 136 extending from the upstanding arm and a second tongue 138 extending radially outward from the collar 134. These two tongues 136, 138 are secured together by a thumb screw 140 or the like which permits the adjustment of the rotational position of the collar relative to the upstanding arm.

The collar 134 includes projections 142 extending radially inward which are adapted to engage spiral grooves 144, shown in FIG. 8, formed in the drive shaft 110 so that linear movement of the handle assembly 128 produces rotation of the drive shaft.

The handle assembly 128, in addition to being supported by the mounting arm 32, is also connected to the carriage 118 by a lost motion connection of the type discussed with reference to the embodiment illustrated in FIG. 1. An example of such a connection is illustrated in FIG. 14.

In carrying out a crosscutting operation, the saw motor 80 is turned on, and the operator grabs hold of the gripping portion 130 of the handle assembly 128 and pulls the assembly in a direction away from the cylindrical portion 30 of the mounting arm. This movement of the handle assembly causes the collar 134 to rotate the drive shaft 110 in a clockwise direction, as shown in FIG. 9.

The rotational movement of the drive shaft is transmitted by the lower pinion gear 114 through the upper pinion gear 108 to the worm gear 104 which is rotated in the clockwise direction as shown in FIG. 9. The over-running clutch 116 provided between the drive shaft 110 and the lower pinion gear 114 transmits the rotation of the drive shaft when the shaft rotates in a clockwise direction. The resulting clockwise rotation of the worm gear causes the bull gear 124 on the carriage 118 to rotate in the counterclockwise direction, as illustrated in FIG. 8. However, the over-running clutch 126 permits the bull gear to rotate without transmitting this movement to the nonrotatable shaft 122 of the carriage 118. Thus, the bull gear rotates freely and the carriage remains motionless during the initial movement of the handle assembly.

Once the handle assembly 128 has been moved through the distance of lost motion provided by the links 100, the assembly exerts a pulling force on the carriage 118 tending to pull the carriage along with the handle assembly in a direction radially outward from the pivot axis of the mounting arm. Because the bull gear 124 is rotating in the counterclockwise direction, movement of the carriage from right to left, as shown in FIG. 8, causes the speed of rotation of the bull gear to slow. However, so long as the carriage 118 moves at a speed equal to or less than the speed of the handle assembly 128, the rotational force acting to rotate the bull gear 124 in the clockwise direction will not overcome the rotational force exerted by the worm gear 104 acting to rotate the bull gear in the counterclockwise direction and no speed limiting force is exerted on the carriage.

If the saw blade 78 encounters resistance in the material being cut, and experiences a moment force tending to cause the blade to run or roll across the material away from the pivot axis toward the operator, this moment force is exerted on the carriage 118 and tends to move it toward the operator at a speed greater than the speed of the handle assembly 128. When this accelerated movement occurs, movement of the carriage causes the clockwise rotational force acting on the bull gear to overcome the counterclockwise rotation supplied by the worm gear. Thus, the bull gear begins to rotate in the clockwise direction. However, any actual clockwise rotation of the bull gear relative to the nonrotatable shaft causes engagement of the over-running clutch between the bull gear and the shaft such that the bull gear is locked against such rotational movement thus preventing the carriage from kicking toward the operator at a speed greater than that permitted by the worm gear.

During return movement of the carriage 118, the handle assembly 128 is pushed inward toward the pivot axis by the biasing mechanism 102. During this movement of the handle assembly, as well as during subsequent movement carried out by the operator, the collar 134 rotates the drive shaft 110 in a clockwise direction, which rotation is not transmitted to the lower pinion gear 114 due to the disengagement of the over-running clutch 116.

During return movement of the carriage, the carriage rotates the bull gear in the counterclockwise direction along the worm gear 104 and this movement is permitted by the over-running clutch 126 which is disengaged during such counterclockwise rotation of the bull gear.

Figure 15:
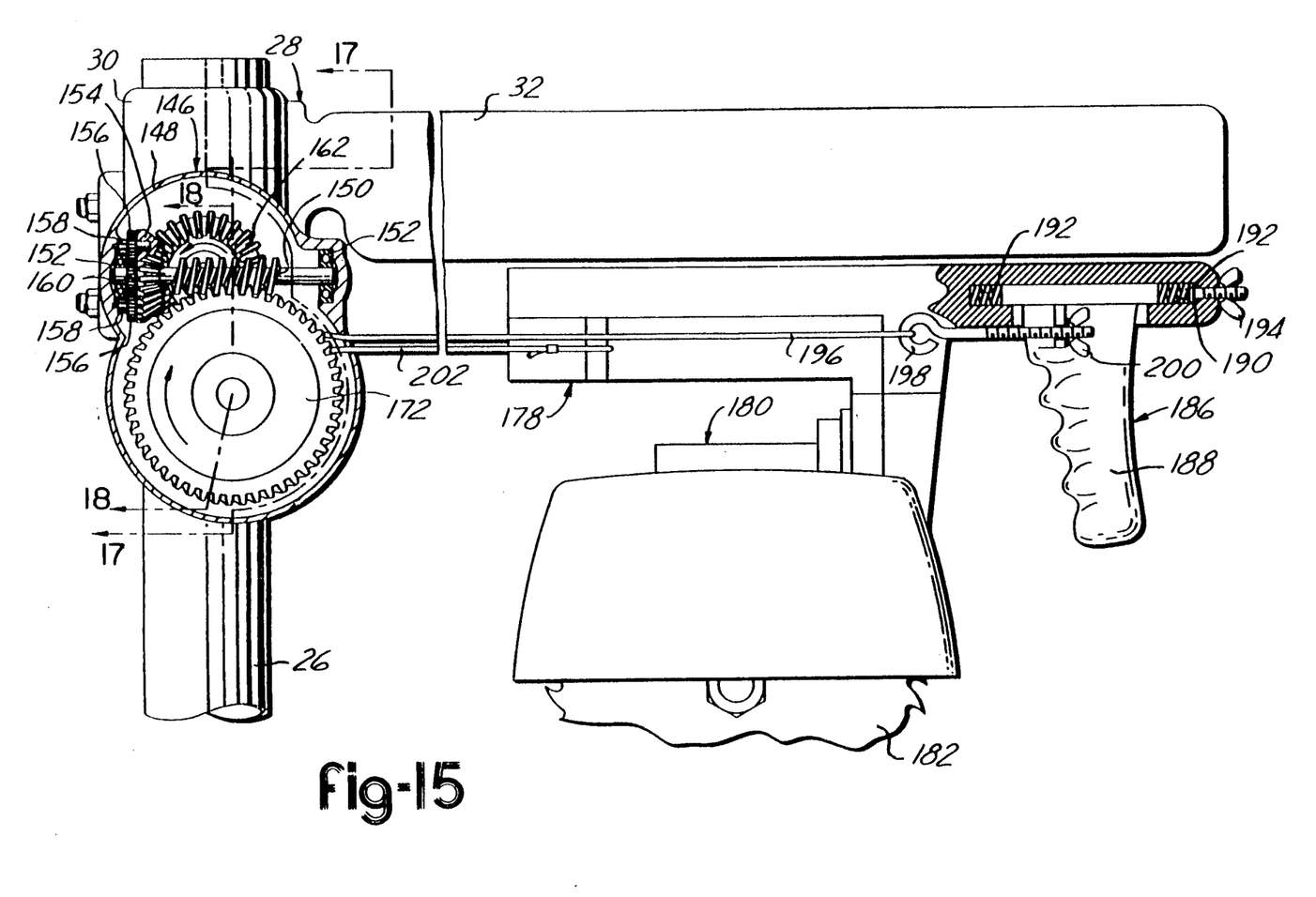
FIG. 15 is a side elevational view, partially in section, of a radial arm saw constructed in accordance with a third preferred construction of the present invention.

A radial arm saw constructed in accordance with a third embodiment of the present invention is illustrated in FIGS. 15-20. Turning first to FIG. 15, the saw includes a support frame 22 and work table 24 of the type discussed above with reference to the embodiment shown in FIG. 1.

A mounting arm 32 of an arm assembly 28 extends radially outward from the cylindrical portion 30 and is fixed to the cylindrical portion against vertical movement thereon. However, the arm 32 is rotatable relative to the cylindrical portion 30 between any of a plurality of angular positions in order to permit the arm to be disposed above the work table at any desired angle.

A load and speed control assembly 146 is supported on the mounting arm adjacent the cylindrical portion so that the assembly 146 pivots with the mounting arm 32 relative to the frame 22. The assembly 146 includes a housing 148, and a worm gear 150 is provided within the housing and extends in a direction parallel with the length of the mounting arm 32. The worm gear 150 is supported for rotational movement relative to the housing by a bearing assembly 152 provided at each axial end of the worm gear. A first bevel gear 154 is supported for rotation on the worm gear 150 at one axial end thereof.

A planetary gear transmission is provided between the first bevel gear 154 and the worm gear 150. The planetary gear transmission includes two pinion gears 156 which are supported for rotation in a back surface of the first bevel gear 154, each of the pinion gears 156 being provided with a smaller pinion gear 158 that rotates therewith. The bearing assembly 152 adjacent the first bevel gear 154 includes an outer race secured to the housing and provided with external gear teeth which mesh with the smaller pinion gears 158. An additional pinion gear 160 is provided for rotation with the shaft of the worm gear 150 and engages the two pinion gears 156.

Rotation of the first bevel gear 154 causes the smaller pinion gears 158 to rotate via engagement with the gear teeth on the outer race of the bearing assembly. This rotation of the smaller pinion gears is transmitted to the additional pinion gear 160 through the two pinion gears 158, thus carrying out rotation of the worm gear 150.

Figures 16, 17, 18, 19, 20:
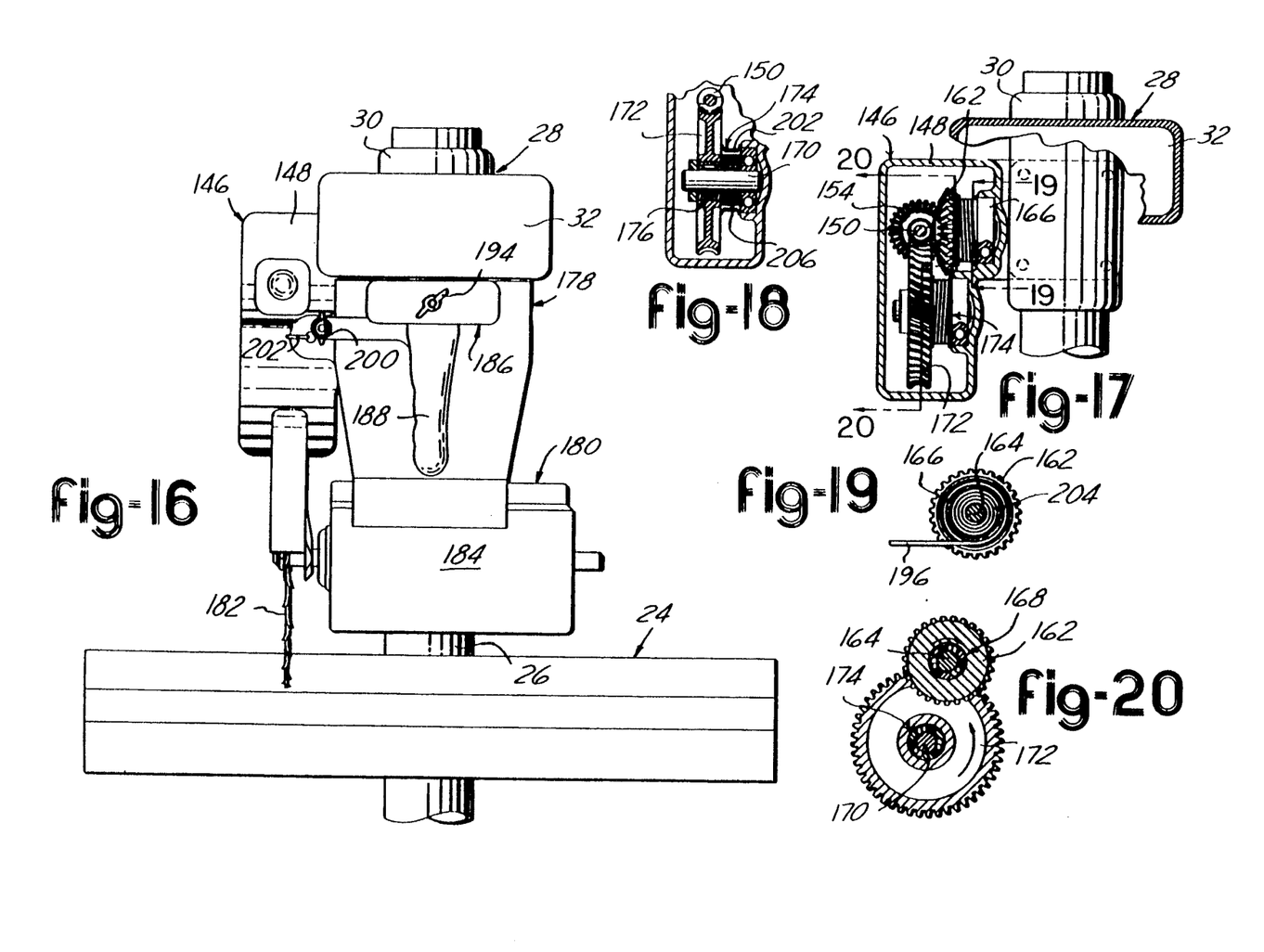
FIG. 16 is a front elevational view of the radial arm saw shown in FIG. 15.
FIG. 17 is a sectional view of the radial arm saw taken along line 17—17 in FIG. 15.
FIG. 18 is a sectional view of the radial arm saw taken along line 18—18 in FIG. 15.
FIG. 19 is a sectional view of the radial arm saw taken along line 19—19 in FIG. 17.
FIG. 20 is a sectional view of the radial arm saw taken along line 20—20 in FIG. 17.

As shown in FIG. 17, a second bevel gear 162 is supported for rotation within the housing 148 and is mounted on a shaft 164 extending in a direction transverse to the length of the worm gear 150. The second bevel gear meshes with the first bevel gear 154 in order to transmit rotation to the worm gear upon rotation of the second bevel gear. The shaft 164 is also connected to a cable drum 166 via an over-running clutch 168 such that rotation of the cable drum 166 in the counterclockwise direction is transmitted to the second bevel gear by the over-running clutch.

As shown in FIG. 18, a second shaft 170 is also provided within the housing which extends in a direction parallel to the first shaft 164. A bull gear 172 is supported for rotation on this second shaft, as is a second cable drum 174. The cable drum 174 is connected to the bull gear 172 via an over-running clutch 176 so that rotation of the bull gear is permitted in the clockwise direction, as shown in FIG. 15, relative to the second cable drum.

A carriage 178 is mounted on the arm 32 and is movable along the arm in a radial direction relative to the cylindrical portion 30. The carriage is supported on the arm in a conventional manner by a set of rollers or the like which permit linear movement of the carriage while preventing any significant amount of travel in any direction other than along the arm.

A saw blade assembly 180 is mounted on the carriage 178, and is fitted with a saw blade 182 and a saw motor 184 for driving the blade. Typically, the blade 182 and motor 184 are movable together about a horizontal axis relative to the carriage to carry out various beveled crosscuts and rip cuts. In addition, the saw blade assembly 180 is rotatable relative to the carriage 178 about a vertical axis between a crosscutting position and a rip cutting position.

A handle assembly 186 is supported by the carriage 178 for linear movement with the carriage at a desired speed in order to carry out movement of the carriage. The handle assembly 186 includes a gripping portion 188 by which the assembly may be grasped by an operator when the carriage is to be moved relative to the arm.

The handle assembly 186, in addition to being supported by the carriage 178, is also connected thereto by a lost motion connection including a slot 190 within which the handle assembly may be slid. A compression spring 192 is provided on either end of the handle assembly within the slot, and a thumb screw 194 or other adjustment means is provided for adjusting the compressive force of the springs 192 on the handle assembly 186 in order to adjust the amount of lost motion between the assembly and the carriage.

A first cable 196 is connected to the handle assembly 186 via an adjustable eye-bolt 198 and wing nut 200, and extends around the first cable drum 166 in the direction shown in FIG. 19. A second cable 202 is connected to the carriage 178 and extends around the second cable drum 174 in a direction opposite to that of the first cable, as shown in FIG. 17.

In order to operate the saw in carrying out a crosscutting operation, the saw motor 80 is turned on, and the operator grabs hold of the gripping portion 188 of the handle assembly 186 and pulls the assembly in a direction away from the cylindrical portion of the mounting arm 32. This movement of the handle assembly causes the first cable 196 to unwind from the first cable drum 166, producing counterclockwise rotation of the cable drum, as shown in FIG. 15.

The rotation of the first cable drum is transmitted to the second bevel gear 162 via the over-running clutch 168, as shown in FIG. 20. The first bevel gear 154 is driven by the second bevel gear 162, and the rotation of the first bevel gear, through the planetary gear transmission as discussed above, rotates the additional pinion gear 160, and thus the worm gear 150, in the counterclockwise direction, as viewed in FIG. 17. The counterclockwise rotation of the worm gear causes the bull gear 172 to rotate in the clockwise direction, as illustrated in FIG. 15. However, the second over-running clutch 176 permits the bull gear to rotate without transmitting this movement to the second cable drum 174. Thus, the carriage remains motionless during the initial movement of the handle assembly 186.

Once the handle assembly has been moved through the distance of lost motion within the lost motion connection, the assembly 186 exerts a pulling force on the carriage tending to pull the carriage along with the handle assembly in a direction radially outward from the pivot axis of the mounting arm. Because the bull gear 172 is rotating in the clockwise direction, movement of the carriage from left to right, as shown in FIG. 15, is permitted since the second cable drum 174 is free to rotate in the clockwise direction at any speed less than the speed of the bull gear 172. Thus, the carriage is free to follow the handle assembly at whatever speed the handle assembly is pulled, so long as the carriage does not attempt to exceed the speed of the handle assembly.

If the saw blade 182 encounters resistance in the material being cut, and experiences a moment force tending to cause the blade to run or roll across the material away from the pivot axis toward the operator, this moment force is exerted on the carriage 178 and tends to move it toward the operator at a speed greater than the speed of the handle assembly 186. When this accelerated movement occurs, the cable drum is forced to rotate in the clockwise direction, as shown in FIG. 15, at a speed greater than the speed of the bull gear 172 such that the relative rotation between the cable drum 174 and the bull gear attempts to overcome the clockwise rotational speed of the bull gear. Because the speed of rotation of the worm gear 150 limits the speed of rotation of the bull gear 172, any rotation of the bull gear at a speed greater than that permitted by the worm gear is limited such that the bull gear is prevented from rotating at speeds greater than that permitted by the worm gear. Thus, the carriage is prevented from kicking toward the operator at a speed greater than that permitted by the speed of rotation by the worm gear 150.

During return movement of the carriage 178, the handle assembly 186 is pushed inward toward the pivot axis by the operator. The handle assembly moves through the distance of lost motion in the connection toward the carriage. During this movement of the handle assembly, as well as during subsequent movement thereof, the first cable 196 is wound onto the first cable drum 166 by a return spring 204 provided on the drum, as shown in FIG. 19. The rotation of the first cable drum is not transmitted to the second bevel gear since the over-running clutch 168 is disengaged during this rotational movement, as shown in FIG. 20.

Thereafter, the handle assembly and carriage move together toward the pivot axis upon the exertion of a further pushing force by the operator until the desired position of the saw blade is reached. The second cable 202 is rewound onto the second cable drum 174 under the driving force of a return spring 206 provided on the second cable drum, as shown in FIG. 18. The rotation of the second cable drum during rewinding of the second cable is not transmitted to the bull gear 172 since this movement is permitted by the over-running clutch 176 which is disengaged during such rotation, as shown in FIG. 20.

Although the invention has been described in detail with reference to the illustrated preferred embodiment, it is noted that substitutions may be made and equivalent employed herein without departing from the scope of the invention as set forth in the claims. For example, although three separate constructions of the preferred embodiment are illustrated, it is noted that the elements of each of these constructions may be substituted for or replace other elements shown in the other described constructions. For example, although the handle biasing mechanism illustrated in FIGS. 1 and 8 differs from the biasing mechanism employed in the embodiment shown in FIG. 15, it is possible to substitute the mechanism of FIG. 15 into either of the embodiments of FIGS. 1 and 8.

Further, although the invention is described with reference to the saw apparatus illustrated, it is understood that the speed control assembly of the present invention could be applied to a multitude of uses, including but not limited to cranes, elevators and the like.

Likewise it should be noted that in all three embodiments of the instant invention it is necessary that the combined ratios of the power shunt drive train that drives the speed control mechanism must exactly match the combined ratios of the primary or speed control drive train as is translated to linear movement of the control handle as compared to the carriage movement when advanced in the first direction along the radial arm.

What is claimed is:

1. A power driven saw comprising:
   a mounting arm;
   a carriage mounted for linear movement in first and second linear directions along the arm;
   a handle mounted on the arm for linear movement in the first and second linear directions at a desired speed in order to carry out movement of the carriage, the handle being movable relative to the carriage through a limited range of movement when an operating force is exerted on the handle;
   force transmitting means for transmitting to the carriage at least a portion of the operating force exerted on the handle in the first direction;
   speed control means for limiting the maximum speed at which the carriage may be moved in the first linear direction along the mounting arm to the speed of the handle, the speed control means permitting movement of the carriage in the first linear direction at any speed equal to or less than the speed of the handle while preventing movement of the carriage in the first linear direction at a speed greater than the speed of the handle; and
   shunting means for transmitting the movement of the handle to the speed control means for driving the speed control means and for establishing the maximum speed at which the speed control means permits the carriage to be moved in the first linear direction, the speed control means preventing the carriage from moving in the first linear direction until the movement of the handle has been transmitted to the speed control means by the shunting means.

2. A power driven saw as recited in claim 1, wherein the force transmitting means includes a lost motion connection between the handle and the carriage which permits the relative movement of the handle.

3. A power driven saw as recited in claim 1, wherein the speed control means includes a nonrotatable shaft secured to the carriage, a bull gear, and an over-running clutch supporting the bull gear on the nonrotatable shaft and permitting rotation of the bull gear on the shaft in a first direction while preventing rotation of the bull gear in the opposite direction, the shunting means rotating the bull gear in the first direction at a speed sufficient to permit movement of the carriage in the first linear direction at a speed equal to or less than the speed of the handle.

4. A power driven saw as recited in claim 1, wherein the shunting means includes a worm gear supported on the mounting arm and being rotated in a first direction upon movement of the handle in the first linear direction for transmitting the movement of the handle to the speed control means, the speed of rotation of the worm gear being dependent upon the speed of movement of the handle in the first linear direction.

5. A power driven saw as recited in claim 3, wherein the shunting means includes a worm gear supported on the mounting arm and being rotated in a first direction upon movement of the handle in the first linear direction for transmitting the movement of the handle to the bull gear in order to rotate the bull gear in the first direction, the speed of rotation of the worm gear being dependent upon the speed of movement of the handle in the first linear direction.

6. A power driven saw as recited in claim 4, wherein the worm gear includes a first pinion secured for rotation with the worm gear, the shunting means further including a drive shaft rotatably supported on the mounting arm, a second pinion secured to the drive shaft and engaged with the first pinion for transmitting rotation of the drive shaft to the worm gear, and linear-to-rotatable conversion means for converting linear movement of the handle into rotatable movement of the drive shaft.

7. A power driven saw as recited in claim 5, wherein the worm gear includes a first pinion secured for rotation with the worm gear, the shunting means further including a drive shaft rotatably supported on the mounting arm, a second pinion secured to the drive shaft and engaged with the first pinion for transmitting rotation of the drive shaft to the worm gear, and linear-to-rotatable conversion means for converting linear movement of the handle into rotatable movement of the drive shaft.

8. A power driven saw as recited in claim 6, wherein the linear-to-rotatable conversion means is connected between the handle and the drive shaft and includes a second over-running clutch which permits linear movement of the handle to be transmitted to the drive shaft upon movement of the handle in the first linear direction while preventing transmission of the movement of the handle in the second linear direction.

9. A power driven saw as recited in claim 6, wherein the shunting means further includes adjustment means for adjusting the rotational position of the drive shaft relative to the linear-to-rotatable conversion means in order to adjust the amount of movement of the handle which is necessary in order to transmit the movement of the handle to the speed control means.

10. A speed and load controlling apparatus for use in limiting the maximum speed at which a load may be moved in a first direction, the apparatus comprising:
 a force transmitting member adapted to receive a moving force and to transmit the moving force to the load so as to carry out movement of the load in the first direction at a predetermined speed, the force transmitting member being movable relative to the load through a limited range of movement;
 force transmitting means for transmitting to the load at least a portion of the moving force exerted on the force transmitting member;
 speed control means for limiting the maximum speed at which the load may be moved in the first direction to the speed of the force transmitting member, the speed control means permitting movement of the load in the first direction at any speed equal to or less than the speed of the force transmitting member while preventing movement of the load in the first direction at a speed greater than the speed of the force transmitting member; and
 shunting means for transmitting the movement of the force transmitting member to the speed control means for driving the speed control means and for establishing the maximum speed at which the speed control means permits the load to be moved in the first direction, the speed control means preventing the load from moving in the first direction until movement of the force transmitting member has been transmitted to the speed control means by the shunting means.

11. A speed and load controlling apparatus as recited in claim 10, wherein the shunting means includes a worm gear rotatable in a first direction upon movement of the force transmitting member in the first direction for transmitting the movement of the force transmitting member to the speed control means, the speed of rotation of the worm gear being dependent upon the speed of movement of the force transmitting member in the first direction.

* * * * *